AUTOMATIC ELECTRICAL ANALOGUE COMPUTER

Filed April 25, 1958 3 Sheets-Sheet 1

INVENTOR.
SAUL MEYER
BY Arthur H. Swanson
ATTORNEY.

Aug. 29, 1961 S. MEYER 2,998,186

AUTOMATIC ELECTRICAL ANALOGUE COMPUTER

Filed April 25, 1958 3 Sheets-Sheet 2

INVENTOR.
SAUL MEYER

BY Arthur H. Swanson

ATTORNEY.

INVENTOR.
SAUL MEYER

BY Arthur H. Swanson

ATTORNEY.

United States Patent Office 2,998,186
Patented Aug. 29, 1961

2,998,186

AUTOMATIC ELECTRICAL ANALOGUE COMPUTER

Saul Meyer, Havertown, Pa., assignor to Minneapolis-Honeywell Regulator Company, Minneapolis, Minn., a corporation of Delaware Filed Apr. 25, 1958, Ser. No. 731,035
9 Claims. (Cl. 235—61.1)

This invention relates to electrical computers. More specifically, the present invention relates to an electrical analogue computer.

An object of the present invention is to provide an improved automatic electrical analogue computer.

In electrical analogue computer circuits, the variable quantities used in the mathematical computations are usually represented by settings of potentiometric devices. The potentiometric devices have heretofore, frequently been manually-adjustable multi-turn variable resistors. The potentiometric device comprising a multi-turn adjustable resistor is hereinafter referred to as a potentiometer. It has been found that the manual adjustments of the potentiometers allow human errors to occur in the entry of the variable quantities into the computer. The manual potentiometers also prevent the rapid entry of the variable quantities into the computer. Frequently, it is desirable to use information recorded on a storage medium as the variable quantity input signals to the computer. The aforementioned potentiometers would ordinarily prevent a direct utilization of the recorded information. In addition, analogue computers employing manual potentiometers may require additional circuitry to perform the mathematical computations to the variable input quantities.

It is, accordingly, an object of the present invention to provide an improved apparatus for overcoming the aforementioned disadvantages of prior art analogue computers.

Another object of the present invention is to provide an improved electrical analogue computer which uses electromechanically operated potentiometric devices.

Still another object of the present invention is to provide an improved electrical analogue computer capable of utilizing variable input quantity information supplied directly from a storage medium.

A further object of the present invention is to provide an improved electrical analogue computer capable of automatically utilizing new variable input quantities after each computation.

A further object of the present invention is to provide an improved external control for an electrical analogue computer, which control is particularly suited for the computer and is characterized by simplified manual operation.

A still further object of the present invention is to provide an improved electrical analogue computer which performs mathematical computations with automatically responsive electromagnetically operated potentiometric devices.

Still another further object of the present invention is to provide an improved electrical analgoue computer with simplified operation and construction.

In accomplishing these and other objects, there has been provided, in accordance with the present invention, an analogue computer utilizing electro-mechanically adjustable potentiometric devices. The variable input quantities are entered into the potentiometric devices directly from storage devices in response to a pre-determined operating cycle of the computer. The mathematical computations are performed by the potentiometric devices during the operating cycle of the computer. The results of the mathematical computations are read out directly from the potentiometric devices into additional storage devices at the completion of the operating cycle.

A better understanding of the present invention may be had from the following detailed description when read in connection with the accompanying drawings, in which.

Figure 3:
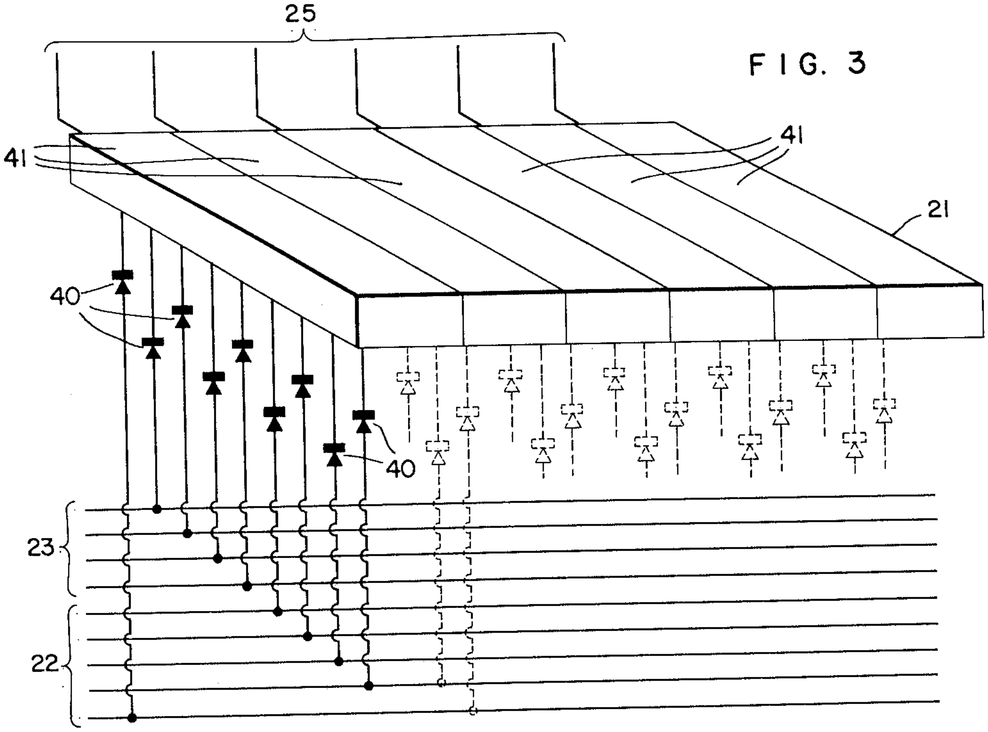
FIG. 3 is a representation of a pinboard program controller device for controlling the operation of the computer shown in FIG. 1.
Figure 3A:
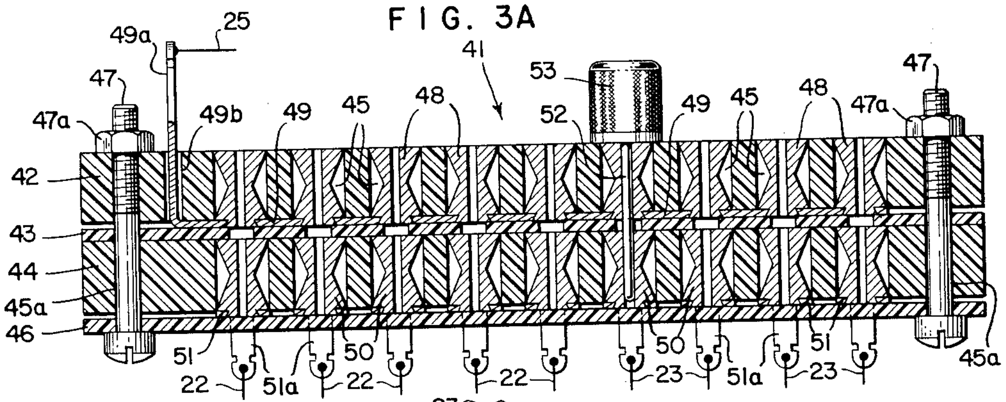

FIG. 3*a* is an assembled representation of a unit of the program controller device shown in FIG. 3.

Figure 3B:
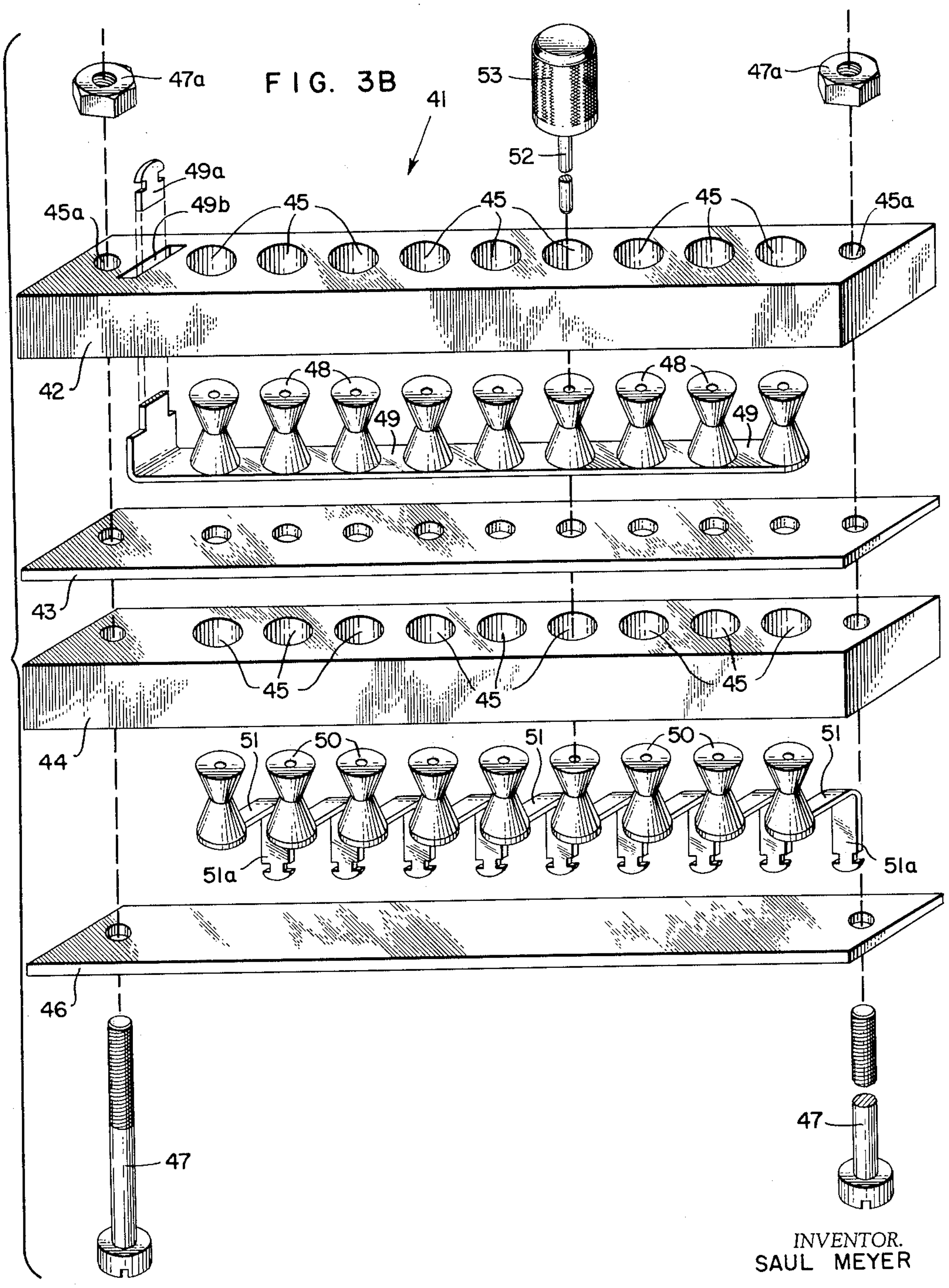

FIG. 3*b* is an exploded representation of the device shown in FIG. 3*a*.

Figures 1, 2:
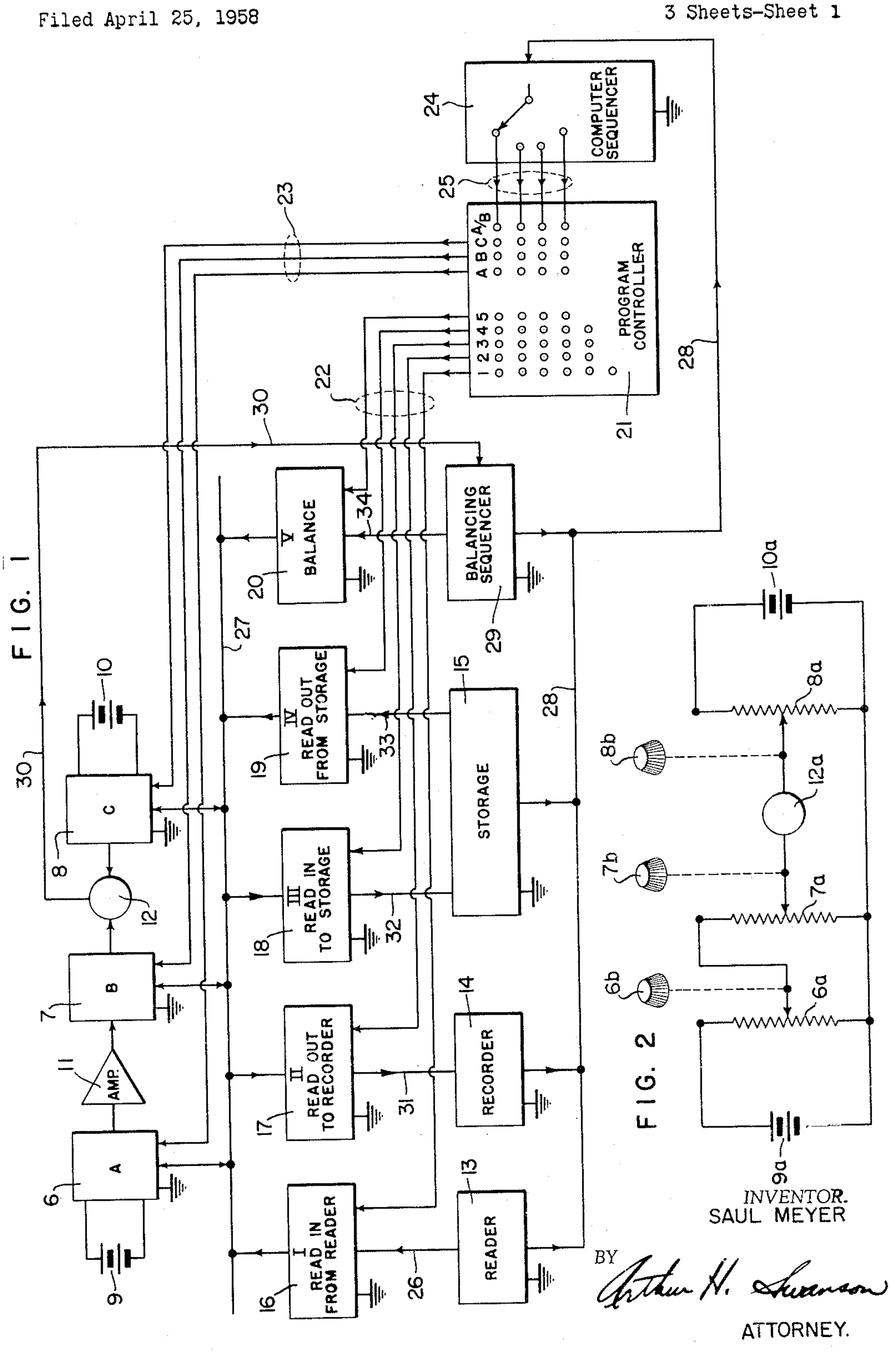
FIG. 1 is a schematic diagram of an analogue computer embodying the present invention.
FIG. 2 is a schematic diagram of a simplified structure for a circuit which may be used to perform the computing function of an analogue computer such as that shown in FIG. 1.
Figure 4:
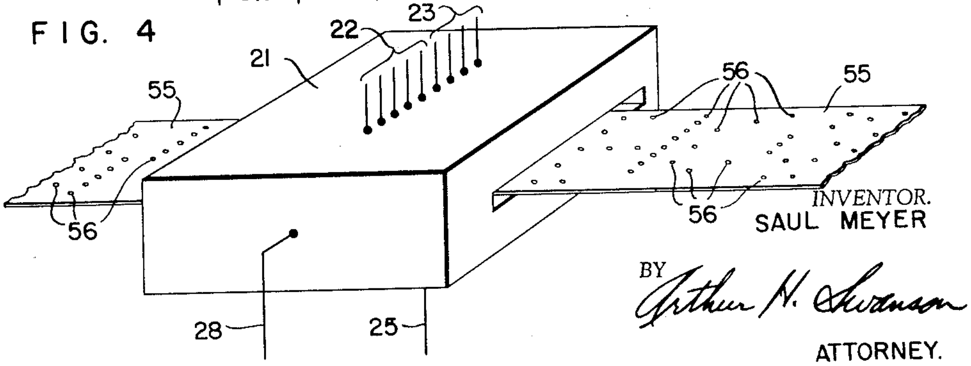

FIG. 4 is a representation of another program controller device for controlling the operation of the computer shown in FIG. 1.

Referring to FIG. 1 in more detail, there is shown an analogue computer with three electromechanically adjustable potentiometric devices 6, 7, 8. A suitable potentiometric device of this general type is shown in U.S. application No. 644,863, filed March 8, 1957, entitled "Electrical Measuring Apparatus" by Elliot R. Lang. The sequencing switches shown therein are substantially included within a balancing sequencer 29 of the present invention. The potentiometric devices 6, 7, 8 are hereinafter referred to as a first voltage divider 6, a second voltage divider 7 and a third voltage divider 8. A voltage source 9 for the first voltage divider 6 and a voltage source 10 for the third voltage divider 8 are substantially identical to the power supply of the aforementioned patent. The power supply of the Lubkin patent is omitted when the device disclosed therein is used as the second voltage divider 7 of the present invention. An amplifier 11 is used as an isolating means to prevent interaction between the first voltage divider 6 and the second voltage divider 7. A null detector 12, similar to the differential amplifier of the above cited patent, constitutes the controlling means for the automatic operation of the second voltage divider 7 or the third voltage divider 8.

Operating input signals for the voltage dividers 6, 7, 8 are obtained from a storage medium, such as a perforated tape. A reader 13 is provided for reading the information on the storage medium and supplying suitable information representing signals to the computer. A suitable device for reading a perforated tape type of storage medium is the "Flexowriter" manufactured by the Commercial Controls Division of Friden Manufacturing Company. Output signals from the computer, representing answers to the mathematical computations, are recorded on an output storage medium. The output storage medium may be a perforated tape substantially similar to the input signal storage member. A recorder 14 is provided for recording the output signals on the output storage medium. A suitable device for recording the output signals is the aforementioned "Flexowriter."

An internal storage means 15 is used for temporary storage of information signals representing results of partial computations performed during the operation of the computer. The internal storage means 15 is characterized by the ability to record information signals and, subsequently, to read out the previously recorded signals. Any suitable electronic or mechanical device may be used, such devices being well-known in the art. An example of a suitable mechanical device is a relay bank comprising selectively operable relays. The storage function of the relay bank is obtained by means of cooperating contacts on the selected relays.

A plurality of gating devices 16, 17, 18, 19, 20 are provided for controlling the flow of the information signals used during the operation of the computer. The gating devices 16, 17, 18, 19, 20 may be multi-contact relays. It will be appreciated that any suitable mechanical or electronic gating device may be used. The gating devices 16, 17, 18, 19, 20 are operated by means of signals from a program controller 21. The signals controlling the gate devices 16, 17, 18, 19, 20 are fed along pre-selected ones of a plurality of control lines 22, according to the computer commands set up on the program controller 21. The program controller 21 may be a device as shown in FIGS. 3, 3*a*, 3*b*. A computer sequencer 24 is provided as a means for sequentially selecting the computer commands on the program controller 21. The computer sequencer 24 may be any suitable mechanical or electrical cyclically controlled, sequentially operated device. A suitable mechanical device of this type is a stepping switch with a plurality of sequentially actuated contacts.

The mathematical operations of the computer are performed in a manner well-known in the art. The following description is a review of the operating principles of a typical potentiometeric device computer using manually adjustable multi-turn variable resistors, or potentiometers. As shown in FIG. 2, the computer comprises three potentiometers 6*a*, 7*a*, 8*a* and two voltage sources 9*a*, 10*a*. A null detector 12*a*, similar to the null detector 12 shown in FIG. 1, indicates the proper settings of the potentiometers 6*a*, 7*a*, and 8*a*. The manual settings of the potentiometers 6*a*, 7*a*, 8*a* are observed on the calibrated dials 6*b*, 7*b*, 8*b*, such dials being customarily used with multi-turn variable resistors.

A first mode of operation of the computer is the multiplication function. In the following example of multiplication, an arbitrary value of 8 volts for each of the voltage sources 9*a*, 10*a* is chosen. In the examples of computer operation discussed herewith, the potentiometers 6*a*, 7*a*, 8*a* are referred to as a first potentiometer 6*a*, a second potentiometer 7*a* and a third potentiometer 8*a*.

The numbers to be multiplied together, in this example, are 0.5 and 0.3. The first potentiometer 6*a* is adjusted to 0.5 of the indicated full-scale displacement on its calibrated dial. The voltage at the arm of the first potentiometer 6*a* after the above mentioned adjustment is 0.5×8 v.=4 volts.

The 4 volt signal is applied across the second potentiometer 7*a*. The dial of the second potentiometer 7*a* is set to .3 of its indicated full-scale displacement. The voltage at the arm of the second potentiometer 7*a* is 0.3×4 v.=1.2 volts.

If the third potentiometer 8*a* is subsequently manually adjusted until the null detector 12 indicates an equality between the arms of the second potentiometer 7*a* and the third potentiometer 8*a*, the voltage at arm of the third potentiometer 8*a* is also 1.2 volts. The calibrated dial of the third potentiometer 8*a* indicates a setting of 0.15 of the full-scale displacement, since $$0.15=\frac{1.2\text{ v.}}{8\text{ v.}}$$

As a result, the setting of the calibrated dial of the third potentiometer 8*a* is equal to the product of the dial setting of the first potentiometer 6*a* and the dial setting of the second potentiometer 7*a*.

A second mathematical operation is the division function of the computer. The two voltage sources 9*a*, 10*a* are again assumed to be the 8 volt value as used in the multiplication example. The sample problem in division comprises the division of 0.15 by 0.5. The first potentiometer 6*a* is adjusted to 0.5 of the full-scale displacement indicated on its calibrated dial. The voltage at the arm of the first potentiometer 6*a* is 0.5×8 v.=4 volts.

The third potentiometer 8*a* is set to 0.15 of the full-scale displacement indicated on its calibrated dial. The voltage at the arm of the third potentiometer 8*a* is 0.15×8 v.=1.20 volts.

The 4 volt signal from the first potentiometer 6*a* is applied across the second potentiometer 7*a*. The second potentiometer 7*a* is adjusted until the null detector 12*a* indicates an equality between the arm of the second potentiometer 7*a* and the arm of the third potentiometer 8*a*. When the null detector 12*a* indicates the equality last mentioned, the voltage at the arm of the second potentiometer 7*a* is 1.2 volts. The calibrated dial of the second potentiometer 7*a* indicates a setting of 0.3 of dial displacement, since $$0.3=\frac{1.2\text{ v.}}{4\text{ v.}}$$

As a result, the setting of the calibrated dial of the second potentiometer 7*a* is equal to quotient of the dial setting of the third potentiometer 8*a* divided by the dial setting of the first potentiometer 6*a*

$$0.3=\frac{0.15}{0.5}$$

A third mathematical operation is square root extraction function of the computer. The sample square root extraction problem comprises finding the square root of 0.25. The third potentiometer 8*a* is set to 0.25 of the full-scale displacement indicated on its calibrated dial. Assuming the two batteries 9*a*, 10*a* are again at the eight volt value as used in the previous examples, the voltage at the arm of the third potentiometer 8*a* is 8 v.×0.25 =2.0 volts.

The first potentiometer 6*a* and the second potentiometer 7*a* are both, initially, adjusted to the same end of their respective calibrated dials. Subsequently, the first potentiometer 6*a* and the second potentiometer 7*a* are simultaneously adjusted, with equal turns on their respective dials, until the null detector 12*a* indicates a balanced condition. The voltage at the arm of the second potentiometer 7*a* for a null reading of the null detector 12*a* is 2.0 volts. The setting of the calibrated dial of either the first potentiometer 6*a* or the second potentiometer 7*a* is equal to the square root of the setting of the dial of the third potentiometer 8*a*. The square root extraction function is related to the multiplication function with the added operation of simultaneous adjustment of two potentiometers. Algebraically, the square root extraction function operates as follows, with the three potentiometer arm voltages represented by the letters A, B and C:

$$AB=C$$

but $$A=B$$

therefore $$A^2=C$$

or $$A=B=\sqrt{C}$$

The mode of operation of the apparatus of the present invention follows.

Using the potentiometric device shown in the Lang application cited above for each of the potentiometric devices 6, 7, 8, the instructions for the computer shown in FIG. 1 as set up on the program controller 21 using the following code:

I=read in one number from the reader 13
II=read out one number to the recorder 14
III=read in to the storage device 15
IV=read out from the storage device 15
V=balance a selected one of the potentiometric devices 6, 7, 8

In addition, each instruction from the program controller 21 must be directed to a specific one of the potentiometric devices 6, 7, 8. The first, second and third designations for the voltage dividers 6, 7, 8 are addressed by the program controller 21 as A, B and C, respectively. A separate address is provided for the simultaneous operation of two potentiometric devices during a square root computation. The square root address is designated on the program controller 21 as A/B. For instance, an instruction to read a number from the reader 13 into the second voltage divider 7 is set up on the program controller 21 as IB. Similarly, an instruction to read out a number from the storage device 15 into the first voltage divider 6 is set up as IVA. The computer sequencer 24, consequently, sequentially selects for each operation of the computer an instruction and an associated address in the program controller 21.

The following description of operation involves the calculation of a solution to the following problem:

$$\frac{X;Y}{Z}$$

The numbers used in the problem are represented by the letters X, Y, Z. The use of letters in the example problem is an indication of non-restriction of the computer to any specific numbers.

The instructions and the respective addresses are set up on the program controller 21 in the following order:

IA, IB, VC, IA, VB, IIB

The first command is selected by the computer sequencer 24 at the initiation of the computing cycle. An energizing signal is fed from the sequencer 24 along the first of a plurality of sequence control lines 25. The energizing signal is distributed by the program controller 21 according to the pre-set first command; namely, IA. The energizing signal is fed along a selected line of the instruction control lines 22 to open a reader gate 16 cooperating with the reader 13. The selected line of the address control lines 23 feeds the energizing signal to the first voltage divider 6 to enable the divider to receive a signal representing the number X. The number signal is read by the reader 13 from the storage medium and is fed from the reader 13 to the reader gate 16 along a plurality of input signal lines 26. The reader gate 16 transfers the number signal to a plurality of transfer lines 27. The number signal is fed along the transfer lines 27 to the first voltage divider 6 to set up a corresponding voltage at the first divider 6 output. An end-of-operation signal, fed along a feedback line 28 to the computer sequencer 24 from the reader 13, steps the sequencer 24 to the next position.

The second sequentially selected command, IB, distributes the energizing signal in a manner similar to the previously explained first command except that the second voltage divider 7 is prepared for a number signal. The reader 13 reads the signal for the number Y from the storage medium and supplies the number signal to the second voltage divider 7 in a manner as previously explained for the first voltage divider 6. The second voltage divider 7 is set up by the number signal to a corresponding voltage at the second divider 7 output. The input voltage for the second divider 7 is the output voltage of the first divider 6 in a manner as described for the manual potentiometers. At the completion of the transfer of the second number signal, an end-of-operation signal from the reader 13 steps the sequencer 24 to the succeeding position.

The third sequentially selected command, VC, directs the energizing signal to a balance gate 20 and the third divider 8. The opening of the balance gate 20 enables the balancing sequencer 29 to balance the selected third divider 8 in a manner similar to that shown in the above cited Lang application. The third divider 8 is balanced until the null detector 12 indicates an equality between the output voltages of the second divider 7 and the third divider 8. The null detector 12 signals the balancing sequencer 29 along a balance control line 30 at the completion of the balancing operation. When the balancing sequencer 29 completes the balancing operation, an end-of-operation signal from the balancing sequencer 29 to the computer sequencer 24 steps the computer sequencer 24 to the next position.

The fourth command, IA, enables the reader 13 to enter a new number set-up into the first divider 6 in a manner substantially as described above with the addition of automatically removing the old number set-up. The new number signal read by the tape represents the number Z in the example problem. At the end of the transfer of the new number, the computer sequencer 24 is stepped to the next position in a manner previously described.

The fifth command, VB, directs the energizing signal to the balance gate 20 and the second divider 7. The balancing sequencer balances the second divider 7 in a manner as described above with respect to the third divider 8. At the end of the balancing operation, a signal along the feedback line 28 steps the computer sequencer 24 to the next position.

The final command, IIB, for this problem distributes the energizing signal to a recorder gate 17 and the second divider 7. The opening of the recorder gate 17 by the energizing signal enables the selected second divider 7 to transfer an information-signal, corresponding to the result of the fourth command, to the recorder 14. The information signal is fed along the transfer lines 27 to the recorder gate 17 and, subsequently, along a plurality of output signal lines 31 to the recorder 14. The recorder 14 enters the information-signal on the cooperating storage medium. At the end of the recording operation, a signal from the recorder 14, fed along the feedback line 28, steps the computer sequencer 24 to the next position to initiate a new computing cycle.

The example problem, discussed above, included all the computer operations except the instructions III and IV and the address A/B. If the instruction III is selected by the computer sequencer 24 during the operating cycle, the energizing signal opens a storage input gate 18 to allow the transfer of the number signal from the voltage divider selected with the instruction into the storage device 15. The number signal is transferred along the transfer lines 27 to the storage gate 18 and, subsequently, along a plurality of storage input lines 32 to the storage device 15. If the instruction IV is selected by the computer sequencer 24, the storage output gate 19 is opened by the energizing signal. The number signal stored in the storage device 15 is fed along a plurality of storage output lines 33 to the storage output gate 19, and subsequently, to the voltage divider selected by the associated address. At the end of either the storage read-in or the storage read-out operation, the storage device 15 signals the computer sequencer, along the feedback line 28, to step to the next position.

The A/B address is used during a problem when it is desired to operate two voltage dividers simultaneously in response to an associated address. The selection of the A/B address by the computer sequencer 24 allows the energizing signal to prepare two voltage dividers for simultaneous operation; e.g., the simultaneous operation of two voltage dividers during a square root computation, as explained previously. The device selected by the instruction associated with the simultaneous address signals the end of the operation to the computer sequencer 24, as explained above.

The program controller 21 may be a pinboard device as shown in FIGS. 3, 3*a* and 3*b*. FIG. 3 shows a representation of a complete pinboard device comprising a plurality of address and instruction selecting units 41. The number of selecting units may be equal to the number of steps required for a particular problem. Isolating diodes 40, are used to prevent interaction among the units 41 of the pinboard device.

As shown in FIGS. 3*a* and 3*b*, three strips of electrically insulating material 42, 43, 44, differing dimensionally only in thickness, have similar holes 45 provided in similar places. Bolt holes 45*a* are provided in all four of the strips of insulating material 42, 43, 44, 46 in positions to receive a pair of common assembly bolts 47. A first plurality of conductive metal pin connectors 48 are conductively attached to a common conductive-metal strip 49 to be in alignment with the similar holes 45 provided in the strips of insulating material 42, 43, 44. A terminal lug 49*a* is provided for the metal strip 49 as a means for attaching one of the control lines 25. A terminal lug hole 49*b* is provided in the top strip of insulating material 42 to allow the terminal lug 49*a* to project therethrough. A second plurality of conductive-metal pin connectors 50 are conductively attached to separate conductive-metal strips 51. A terminal lug 51*a* is provided for each of the metal strips 51 as a means for attaching to ones of the instruction and address control lines 22, 23. The first plurality of pin connectors 48 and the second plurality of pin connectors 50 are arranged in pairs with the number of pairs of pin connectors equal to the number of instruction and address lines 22, 23. An electrically conductive line 52 is attached to an insulating cap 53 and will connect a pair of the pin connectors when inserted into the selected pair. The energization signal fed along the control lines 25 is distributed, during the selection cycle of the computer sequencer 24, by a plurality of pins inserted in the selected pairs of pin connectors.

Another form of structure which the program controller 21 may assume is shown in FIG. 4. An information-storage member 55 such as a tape or a card containing inscribed information 56 is sensed by an information sensor 21. The information 56 carried by the storage member 55 may be in any of the forms well-known in the art, such as a series of groups of punched holes. The information-sensor 21 may be any suitable device for sensing the information 56 on the storage member 55, such devices being well-known in the art. The end-of-operation signal fed along the feedback line 28 enables the information sensor 21 to sequentially read the information 56 on the information member 55, which inscribed information comprises the commands for the operating cycle of the computer. The computer sequencer 24 is not used with the program controller structure shown in FIG. 4. The energizing signal fed along the control line 25 is distributed by the information sensor 21 according to the information 56 on the storage member 55 during the operating cycle of the computer.

Thus, it may be seen that there has been provided, in accordance with the present invention, an analogue computer utilizing automatic electro-mechanical potentiometric devices, which is characterized by the ability to utilize variable input quantity information directly from a storage medium and to perform mathematical computations on the variable input quantities with the electro-mechanical potentiometric devices.

Subject matter disclosed but not claimed in this application is shown and claimed in the copending application of Saul Meyer, Serial No. 729,961, which was filed on April 21, 1958.

What is claimed is:

1. An analogue computer comprising, in combination, an input circuit including means responsive to an input signal representative of a number, a mathematical computing means, said mathematical computing means including a plurality of automatically operated potentiometric devices, actuating means for actuating said potentiometric devices to perform said mathematical computations whereby to produce an output signal representative of the result of said computations, output means responsive to said output signal, a plurality of gating means connected to selectively couple said input circuit to said mathematical computing means and said output means and said actuating means to said mathematical computing means, means for sequentially controlling said gating means, and means for programming the operation of said last mentioned means thereby to selectively control the operation of said analogue computer.

2. An analogue computer as in claim 1 wherein said programming means comprises a plurality of selector units, each of said selector units having a first group of pin connectors, means providing a common connection for all of said pin connectors of said first group for connection to an energizing signal line, a second group of pin connectors, means for supporting individual ones of said pin connectors of said first group substantially in axial alignment with corresponding individual ones of said pin connectors of said second group and separated by a gap therefrom, means for connecting individual ones of said connectors of said second group separately to corresponding ones of said gating means and said potentiometric devices, means for connecting individual ones of said connectors of said first group to corresponding individual ones of said connectors of said second group for selectively bridging the gap therebetween, means for sequentially energizing each of said selector units, and means for preventing interaction between said selector units.

3. An analogue computer as in claim 1 wherein said programming means comprises a record member having data signals recorded thereon, said data signals being representative of said gating means and said potentiometric devices, cooperating sensing means for reading said data signals, and means responsive to said sensing means for actuating said gating means and said potentiometric devices according to said recorded data.

4. An analogue computer comprising, in combination, an input circuit including means responsive to an input signal representative of a number, said responsive means including a punched tape reader, a mathematical computing means, said mathematical computing means including a plurality of automatically operated potentiometric devices, actuating means for actuating said potentiometric devices to perform said mathematical computations whereby to produce an output signal representative of the result of said computations, output means responsive to said output signal, a plurality of gating means connected to selectively couple said input circuit to said mathematical computing means and said output means and said actuating means to said mathematical computing means, means for sequentially controlling said gating means, and means for programming the operation of said last mentioned means thereby to selectively control the operation of said analogue computer.

5. An analogue computer comprising in combination, an input circuit including means responsive to an input signal representative of a number, a mathematical computing means, said mathematical computing means including a plurality of automatically operated potentiometric devices, actuating means for actuating said potentiometric devices to perform said mathematical computations whereby to produce an output signal representative of the result of said computations, said actuating means including a plurality of stepping switches, output means responsive to said output signal, a plurality of gating means connected to selectively couple said input circuit to said mathematical computing means and said output means and said actuating means to said mathematical computing means, means for sequentially controlling said gating means, and means for programming the operation of said last mentioned means thereby to selectively control the operation of said analogue computer.

6. An analogue computer comprising, in combination, an input circuit including means responsive to an input signal representative of a number, a mathematical computing means, said mathematical computing means including a plurality of automatically operated potentiometric devices, actuating means for actuating said potentiometric devices to perform said mathematical computations whereby to produce an output signal representative of the result of said computations, output means responsive to said output signal, a plurality of gating means connected to selectively couple said input circuit to said mathematical computing means and said output means and said actuating means to said mathematical computing means, means for sequentially controlling said gating means, said sequentially controlling means including a stepping switch, and means for programming the operation of said last mentioned means thereby to selectively control the operation of said analogue computer.

7. An analogue computer comprising, in combination, an input circuit including means responsive to an input signal representative of a number, a mathematical computing means, said mathematical computing means including a plurality of automatically operated potentiometric devices, actuating means for actuating said potentiometric devices to perform said mathematical computations whereby to produce an output signal representative of the result of said computations, output means responsive to said output signal, a plurality of gating means connected to selectively couple said input circuit to said mathematical computing means and said output means, and said actuating means to said mathematical computing means, said gating means including multi-contact relays, means for sequentially controlling said gating means, and means for programming the operation of said last mentioned means thereby to selectively control the operation of said analogue computer.

8. An analogue computer comprising, in combination, an input circuit including means responsive to an input signal representative of a number, a mathematical computing means, said mathematical computing means including a plurality of automatically operated potentiometric devices, actuating means for actuating said potentiometric devices to perform said mathematical computations whereby to produce an output signal representative of the result of said computations, output means responsive to said output signal, said output means including an automatic tape puncher, a plurality of gating means connected to selectively couple said input circuit to said mathematical computing means and said output means and said actuating means to said mathematical computing means, means for sequentially controlling said gating means, and means for programming the operation of said last mentioned means thereby to selectively control the operation of said analogue computer.

9. An analogue computer comprising, in combination, an input circuit including means responsive to an input signal representative of a number, a mathematical computing means, said mathematical computing means including a plurality of automatically operated potentiometric devices, actuating means for actuating said potentiometric devices to perform said mathematical computations whereby to produce an output signal representative of the result of said computations, said mathematical computing means also including an internal storage means for temporarily storing partial results of said computations, output means responsive to said output signal, a plurality of gating means connected to selectively couple said input circuit to said mathematical computing means and said output means, said internal storage means, and said actuating means to said mathematical computing means, means for sequentially controlling said gating means, and means for programming the operation of said last mentioned means thereby to selectively control the operation of said analogue computer.

References Cited in the file of this patent

UNITED STATES PATENTS

| | | |
|---|---|---|
| 2,604,262 | Phelps et al. | July 22, 1952 |
| 2,701,095 | Stibitz | Feb. 1, 1955 |

FOREIGN PATENTS

| | | |
|---|---|---|
| 553,947 | Great Britain | June 11, 1943 |

OTHER REFERENCES

Control Engineering (Taylor et al.), March 1957, pp. 26 and 27.

Proceedings of the Eastern Joint, December 1957, Computer Conference (Taylor), pp. 34–39.